United States Patent [19]

Nakata et al.

[11] Patent Number: 4,772,065
[45] Date of Patent: Sep. 20, 1988

[54] TRACTOR CABIN AND MANUFACTURING METHOD THEREFOR

[75] Inventors: Masaru Nakata, Sakai; Kenichi Sato, Sennan; Katsushi Fukawatase, Sakai; Susumu Arisawa, Kawachinagano; Yasunori Kurata, Sakai; Kengo Sato, Sakai; Hiroaki Taniguchi, Sakai, all of Japan

[73] Assignee: Kubota, Ltd., Osaka, Japan

[21] Appl. No.: 39,825

[22] Filed: Apr. 15, 1987

Related U.S. Application Data

[63] Continuation of Ser. No. 775,858, Sep. 13, 1985, abandoned.

[30] Foreign Application Priority Data

Nov. 26, 1984 [JP] Japan .................................. 59-179023
Feb. 20, 1985 [JP] Japan .................................. 60-32322
Feb. 20, 1985 [JP] Japan .................................. 60-32323

[51] Int. Cl.$^4$ .............................................. B60J 1/00
[52] U.S. Cl. ............................... 264/279; 296/201; 296/96.21
[58] Field of Search ............... 296/190, 146, 78 R, 296/84 R, 84 A, 84 D, 84 E, 93, 197, 200, 201; 119/5; 49/501, 506; 264/279

[56] References Cited

U.S. PATENT DOCUMENTS

| | | | |
|---|---|---|---|
| 2,043,756 | 6/1936 | Lalancette | 296/200 X |
| 2,061,788 | 11/1936 | Wright | 296/200 |
| 2,319,004 | 5/1943 | Lotter | 49/501 X |
| 2,326,789 | 8/1943 | Marine | 296/200 |
| 3,230,677 | 1/1966 | Brown | 296/93 X |
| 3,397,008 | 8/1968 | Timmerman | 296/190 |
| 4,099,763 | 7/1978 | Maier et al. | 296/93 X |
| 4,147,131 | 4/1979 | Walker | 119/5 |
| 4,152,022 | 5/1979 | Castine | 296/190 X |
| 4,162,097 | 7/1979 | Scribner | 296/190 |
| 4,368,797 | 1/1983 | van der Lely | 296/190 X |
| 4,418,955 | 12/1983 | Muncke et al. | 296/190 |
| 4,624,500 | 11/1986 | Heitman | 296/190 X |
| 4,669,564 | 6/1987 | Kreutz | 296/190 X |

FOREIGN PATENT DOCUMENTS

545199 2/1956 Belgium .................................. 296/93

*Primary Examiner*—Robert B. Reeves
*Assistant Examiner*—Russell D. Stormer
*Attorney, Agent, or Firm*—Jordan and Hamburg

[57] ABSTRACT

The disclosed invention provides a tractor cabin and a manufacturing method therefor. A main transparent plate and side transparent plates are caused to adhere to one another or otherwise become an integral whole, by a substantially transparent filling material, to constitute a gate-shaped front face of the cabin.

1 Claim, 5 Drawing Sheets

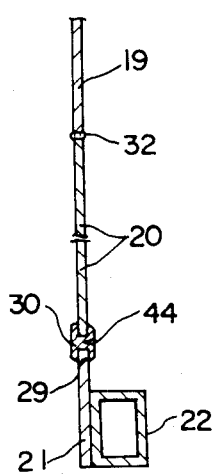
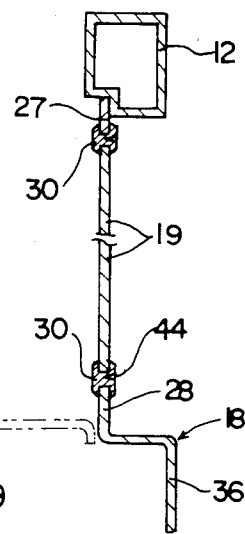
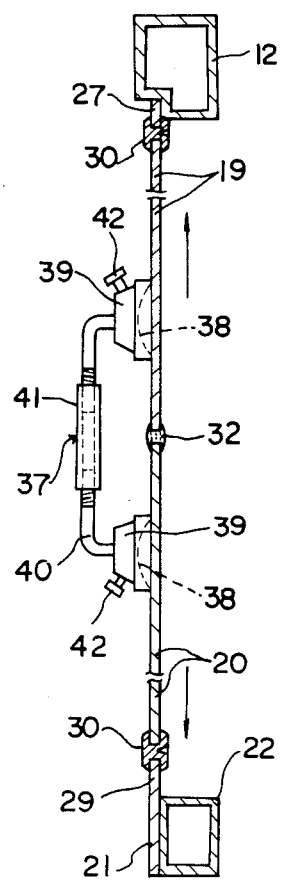
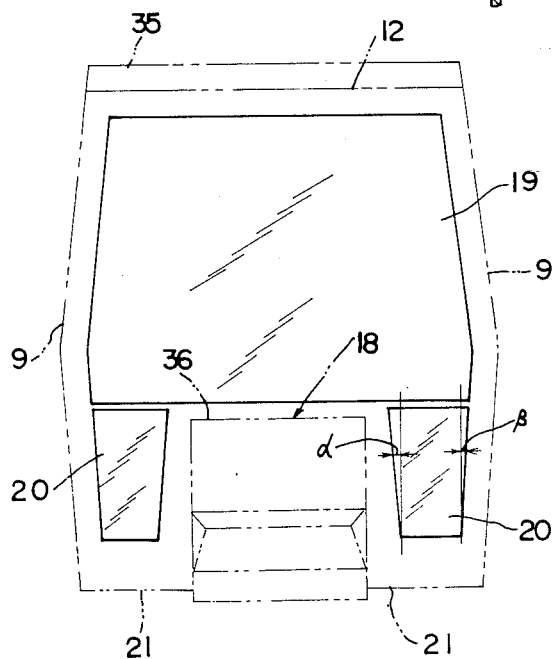

TRACTOR CABIN AND MANUFACTURING METHOD THEREFOR

This application is a continuation of application Ser. No. 775,858 filed Sept. 13, 1985 now abandoned.

BACKGROUND OF THE INVENTION

This invention relates to a tractor cabin and a method of manufacturing the tractor cabin.

A cabin for enclosing a driver's seat, a steering wheel and so on of a tractor is known and disclosed, for example, in Japanese utility model application published for public inspection under No. 58-19877. In order to provide the driver with a forward field of vision, this type of cabin comprises a main front transparent plate disposed above a bonnet and extending between a pair of right and left front struts, and a pair of right and left side transparent plates disposed laterally of the bonnet.

It has been conventional practice, however, that the main transparent plate and the downwardly disposed side transparent plates are interposed by a connecting member extending transversely above the bonnet from one front strut to the other. This connecting member presents an construction in the driver's field of vision, and improvement in this respect has been desired.

SUMMARY OF THE INVENTION

The object of this invention is to provide a tractor cabin and a manufacturing method therefor, wherein a main front transparent plate and a pair of right and left side transparent plates are mounted in a manner to provide a good field of vision.

A tractor cabin according to this invention comprises a pair of right and front struts including lower ends disposed below an upper face of a bonnet, a top frame member extending between upper ends of the right and left front struts, horseshoe shaped center frame means connected to the lower ends of the right and left front struts, a main transparent plate supported by an upper edge portion of the center frame means, the right and left front struts and the top frame member, a pair of right and left side transparent plates supported by the lower ends of the front struts and remaining portions of the center frame means and disposed below the main transparent plate with spaced therebetween, respectively, and a substantially transparent elastic filling material placed in the spaces between the main transparent plate and the side transparent plates.

In the construction of this invention described above, the main front transparent plate is supported from below the upper edge portion of the center frame means, and the side transparent plates are supported from below by the remaining portions of the center frame means. The spaces between the main transparent plate and the side transparent plates are filled with the transparent filling material. Therefore, this construction does not require a connecting member as used in the prior art construction extending below the main transparent plate in the transverse direction, and the transparent filling material presents little or no obstruction in the driver's field of vision. Where the three transparent plates are replaced by a single plate of glass, it is difficult to cut the plate into a shape corresponding to the three transparent plates combined which results in a very poor yield and high cost. On the other hand, this invention permits the three plates to be cut individually and achieves both a good field of vision and low cost.

Moreover, because the filling material is elastic and each of the transparent plates is supported from below, the transparent plates are effectively protected from stress and damage.

Other objects and advantages of the invention will be apparent from the following description.

BRIEF DESCRIPTION OF THE DRAWINGS

The drawings illustrate a tractor cabin embodying the present invention, in which:

FIG. 3 is an enlarged sectional view taken on line III—III of FIG. 1,

FIG. 4 is an enlarged sectional view taken on line IV—IV of FIG. 1,

FIG. 9 is an explanatory illustration of the windshield,

FIG. 10 is a sectional view showing a retainer in use,

DESCRIPTION OF THE PREFERRED EMBODIMENT

Figure 1:
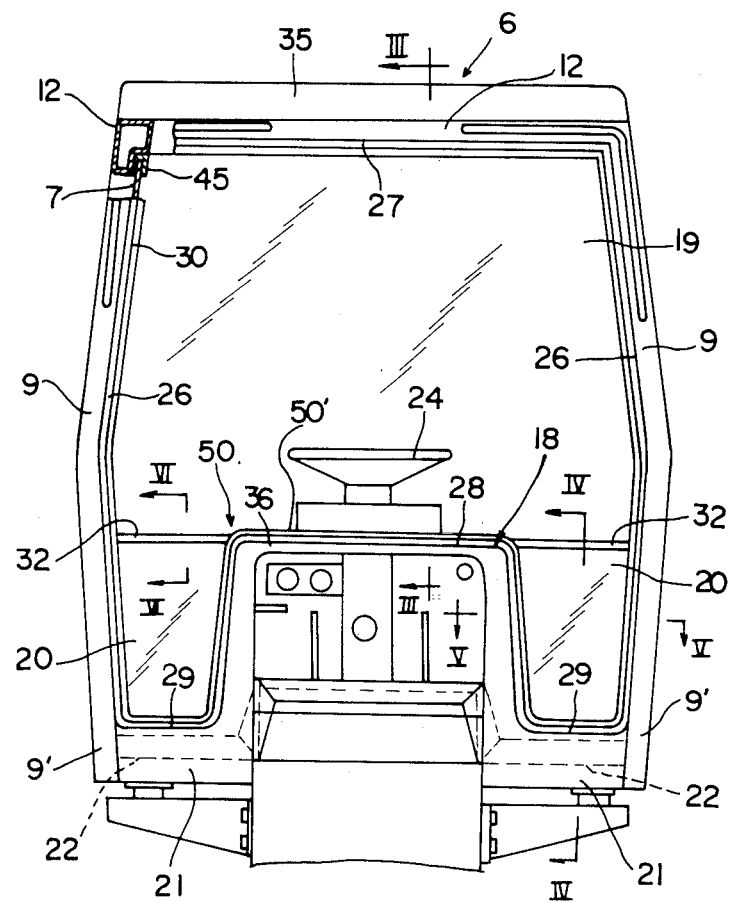
FIG. 1 is a front view of the cabin.
Figure 2:
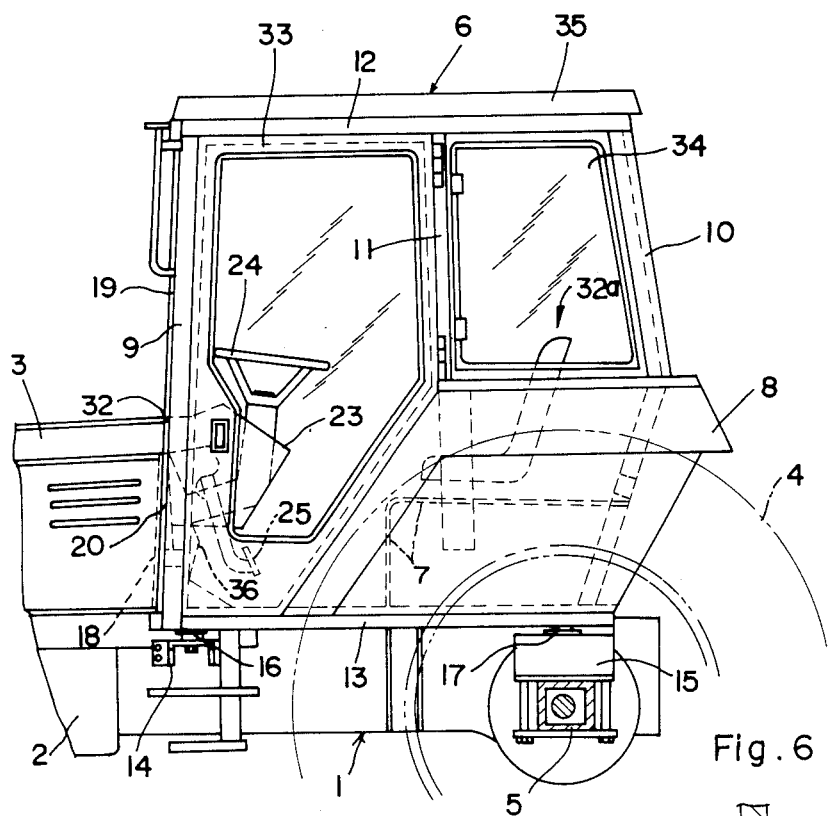
FIG. 2 is a side view of the cabin.
Figure 12:
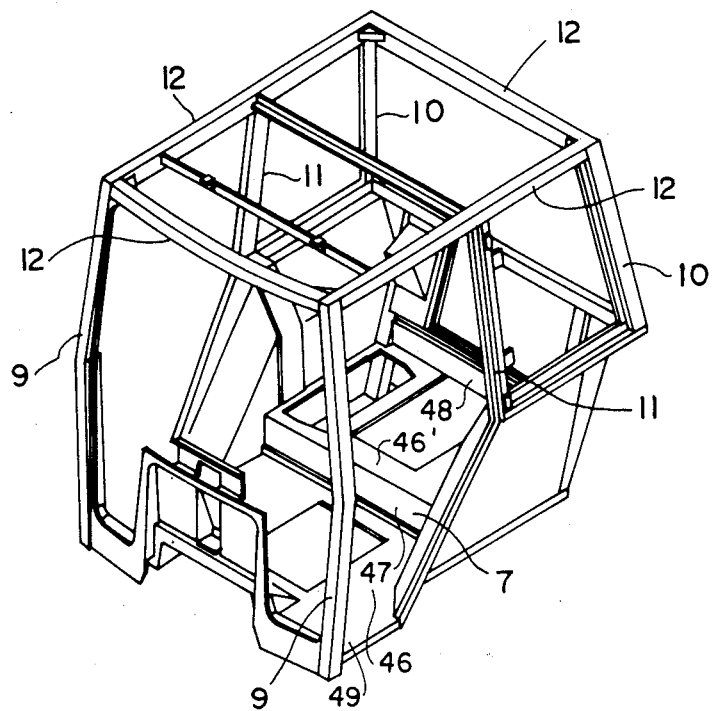
FIG. 12 is a perspective view of the cabin.

An embodiment of the invention will now be described with reference to the drawings. Referring to FIGS. 1 and 2, a tractor 1 comprises an engine 2 mounted at a front portion thereof and covered by a bonnet 3, and rear wheels 4 transversely opposed to each other and supported by a rear axle case 5 at a rear portion of the tractor 1. The tractor 1 carries a driver's cabin 6 fixed to the rear portion thereof. The cabin 6 is defined by a main framework, a floor sheet 7 attached to a bottom of the main framework, and rear wheel fenders 8 attached to opposite lateral sides of the main framework. The perspective view of the main framework is shown in FIG. 12.

The main framework of the cabin 6 comprises a pair of right and light front struts 9, a pair of right and left rear struts 10, a pair of right and left intermediate struts 11 disposed between the front and rear struts 9, 10, and a plurality of top frame members 12 mounted on upper ends of these struts 9, 10 and 11. The main framework further comprises base frames 13 disposed at the bottom thereof and extending longitudinally of the tractor 1. The base frames 13 are supported at front ends thereof by a bracket 14 projecting outwardly of the tractor 1 and at rear ends thereof by a bracket 15 mounted on the rear axle case 5. there are shock absorbers 16 and 17 interposed between the front and rear ends of the base frames 13 and the brackets 14 and 15, respectively.

Figure 5:
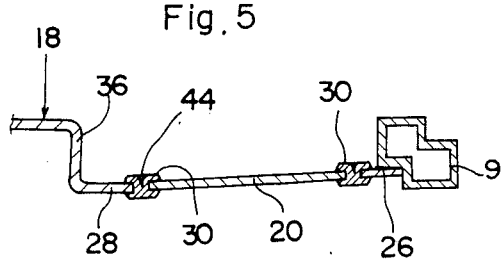
FIG. 5 is an enlarged sectional view taken on line V—V of FIG. 1.

The cabin 6 includes a partition 18 at a front thereof extending between lower portions of the right and left front struts 9, and a windshield comprising a main transparent glass plate 19 and a pair of right and left side transparent glass plates 20 fitted to the front struts 9. The partition 18 is provided with a horseshoe-shaped center frame 36 intermediate between the right and left front struts 9 and surrounding or opposed to the bonnet 3, and connector frames 21 connecting lateral sides of the center frame 36 to lower ends 9' of the front struts 9 positioned below the bonnet 3. The partition 18 has suitable projections and recesses for the interest of rigidity. The partition 18, center frame 36 and connector frames 21 in combination constitute center frame means 50. The connector frames 21 are provided with reinforcements 22. The center frame 36 of the partition 18 is provided with a panel board 23, a steering wheel 24 and a pedal 25, all disposed inside the cabin. Glass mounting ribs 26-29 are attached to or formed integral with inner sides of the front struts 9, a lower sides of the top frame member 12, upper and lateral sides of the center frame 36 and upper sides of the connector frames 21, respectively, as shown in FIGS. 3 through 5. The glass plates 19 and 20 are fitted to the ribs 26-29 through vibration absorbing rubber elements 30 each having an H-shaped section. It will be seen that the mainf ront glass plate 19 is supported by the upper edge portion 50' of the center frame means 50.

Figure 7:
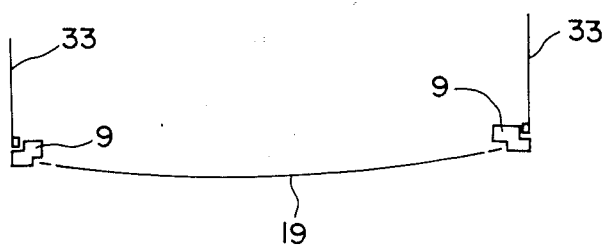
FIG. 7 is a schematic plan view in section of a windshield.
Figure 6:
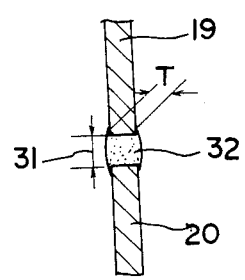
FIG. 6 is an enlarged sectional view taken on line VI—VI of FIG. 1.

Each of the front struts 9 is bent at about a vertically midpoint to protrude laterally outwardly. The main front glass plate 19 has a trapezoidal shape having straight upper and lower edges and is fitted in a space surrounded by the center frame 36, the right and left front struts 9, and the top frame member 12. Each of the side glass plates 20 has an inverted trapezoidal shape tapering downwardly and is fitted in a space surrounded by the center frame 36, one of the front struts 9, one of the connector frames 21 and the main front glass plate 19. As shown in FIG. 6, there is provided a space 31 between a lower end of the main front glass plate 19 and an upper end of each of the side glass plates 20, and this space 31 is substantially equal in dimension to a thickness T of the glass plates 19 and 20. The space 31 is filled with a filling material comprising a transparent adhesive 32 which has elasticity after curing, whereby the upper and lower glass plates 19 and 20 are joined together. As seen in FIG. 7, the main front glass plate 19 is curved to protrude forwardly but the glass plate 19 may be planar.

Reference number 32a denotes a driver's seat mounted on the floor sheet 7. Reference number 33 denotes a cabin door, number 34 denotes lateral glass plates, and number 35 denotes a roof cover.

The cabin 6 having the above construction is lifted, after assembly, by a crane or the like and placed on the tractor 1 with the shock absorbers 16 and 17 interposed therebetween. In manufacture, the main front glass plate 19 and side glass plates 20 are assembled by the following process.

The main framework of the cabin is formed by interconnecting the lower ends of the right and left front struts 9 by means of the center frame 36 and the connector frames 21. Thereafter the vibration absorbing rubber elements 30 each having an H-shaped section are fitted on to the ribs 26-29 provided on the front struts 9, the top frame member 12, the center frame 36 and the connector frames 21.

Figure 8:
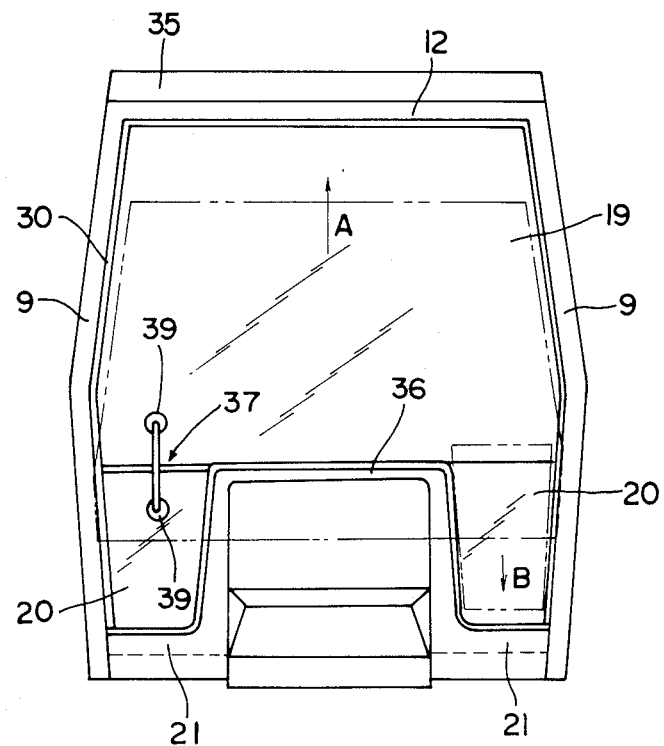
FIG. 8 is an explanatory illustration showing a manufacturing process.

Then the main front glass plate 19 is placed as shown by a phantom line in FIG. 8. From this position the main front glass plate 19 is pushed upward as indicated by an arrow A to fit lateral edges and an upper edge thereof into grooves of the vibration absorbing rubber elements 30 on the front struts 9 and the top frame member 12. The lower edge of the main front glass plate 19 is placed in a groove of the rubber element 30 on the center frame 36, so that the weight of the main front glass plate 19 is borne by the center frame 36. Subsequently, each of the side glass plate 20 is lowered while adjusting its position relative to the rubber elements 30 on the center frame 36, one of the front struts 9 and one of the connector frames 21 as indicated by an arrow B in FIG. 8, to fit lateral edges and a lower edge of the side glass plate 20 into grooves of these rubber elements 30. When the side glass plate 20 in the inverted trapezoidal shape is pushed downwardly into the rubber elements 30, the side glass plate 20 receives a reaction acting upwardly. Therefore, as shown in FIG. 9, the lateral edges of the side glass plate 20 should conveniently have respective angles of inclination $\alpha$ and $\beta$ in the order of 5 to 6 degrees. With such angles of inclination the side glass plate 20 is subjected to only a minor reaction when advanced downwardly, which facilitates its mounting and succeeding adhesion work without any stress acting thereon and also improves its durability.

After the side glass plates 20 are mounted as above, a retainer 37 is used as shown in FIGS. 8 and 10, to adjust the space 31 between the main front glass plate 19 and each of the side glass plates 20 to be substantially equal in dimension to the thickness T of the glass plates 19 and 20.

The retainer 37 comprises a pair of sticking disks 39 having diaphragms 38, and a turn buckle 41 mounted on an intermediate position of a connecting rod 40 interconnecting the two sticking disks 39. Each of the sticking disks 39 is adapted to engage and disengage from glass plates or the like by operating a knob 42 attached thereto. Thus, the sticking disks 39 are placed in engagement with the main front glass plate 19 and one of the side glass plates 20, respectively, and the turn buckly 41 is operated to extend or contract the connecting rod 40 for adjustment of the space 31. Next, the space 31 is filled with a transparent adhesive 32 to cause the main front glass plate 19 and the side glass plate 20 to adhere to each other. The adhesive 32 will serve the purpose if it is transparent and has elasticity after curing. One suitable example for the adhesive 32 is a one component acetic type silicone adhesive such as PANDO 524A (Trademark) manufactured by Kabushiki Kaisha Three Bonds. This adhesive has good transparency, adhesive power, weatherproofness, heat resistance and cold resistance, and an elongation of about 500%.

Figure 11:
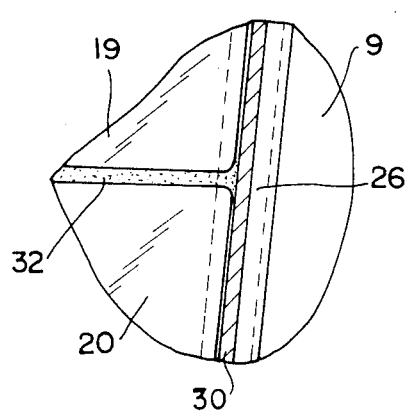
FIG. 11 is an explanatory illustration of an adhesive as applied.

The space 31 filled with the adhesive 32 and having an equal dimension to the thickness T of the glass plates greatly facilitates the assembly work in that application of the adhesive 32 is carried out more easily than when the space is narrower and without requiring a backplate as when the space is very broad. Part of the adhesive 32 as applied to the space 31 will advance from ends of the space 31 into the vibration absorbing rubber elements 30 as shown in FIG. 11, which results in the glass plates being secured to the rubber elements 30 when the adhesive cures. When the adhesive 32 cures, the main front glass plate 19 and the side glass plates 20 adhere to one another and become just as airtight as a single glass plate. Moreover, since the adhering parts are transparent and equal in dimension to the thickness of the glass plates, the driver seated on the seat 32a has a good field of vision with hardly any distortion presented by the adhering parts.

The retainer 37 may just be removed after the adhesive cures. After the main front glass plate 19 and the side glass plates 20 are fitted into the vibration absorbing rubber elements 30, wedge members 44 are applied to the rubber elements 30 from inside the cabin in order to hold the glass plates tight. However, the wedge members 44 may be applied to the rubber elements 30 after the space 31 is adjusted by means of the retainer 37 or after the glass plate adhesion is completed.

In the described embodiment the main front glass plate 19 has a straight lower edge for cutting expediency, but this is not absolutely necessary.

The adhesive may be applied to the main front glass plate 19 and the side glass plates 20 after these glass plates are placed in position with respect to the rubber elements 30. Alternatively, the three glass plates 19 and 20 may first be fixed in position relative to one another by means of retainers 37 and, after the adhesive 32 is filled into the spaces 31, fitted into the rubber elements 30 on the main framework of the cabin, the retainers 37 being removed thereafter.

Although in the described embodiment the main front glass plate 19 is placed in position prior to the side glass plate 20, the order may be reversed.

The adhesive 32 may be replaced by a mere filling material having transparency, such as a plastics material.

Each of the side glass plates 20 which is smaller in area that the main glass plate 19 may be slightly thinner than the latter. These plates may comprise transparent plastics plates instead of glass.

Figure 15:
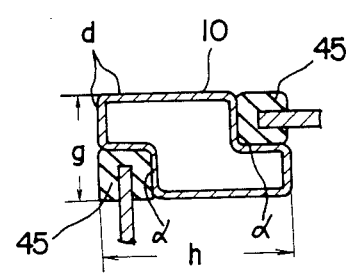
FIG. 15 is a sectional view of a rear strut.
Figure 13:
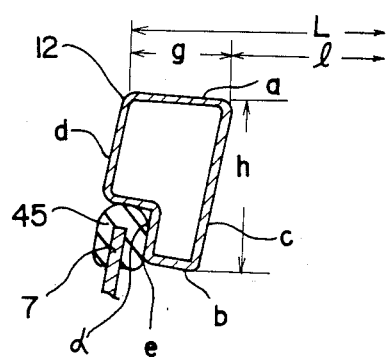
FIG. 13 is a sectional view of a top frame member.
Figure 14:
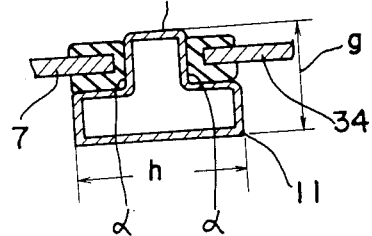
FIG. 14 is a sectional view of an intermediate strut.

Other aspects of the embodiment will be described hereinafter with reference to FIGS. 13 through 15. As shown in FIG. 13, each of the top frame members 12 comprises a square pipe having a parallelogram section. The top frame member 12 has a horizontal upper face a, outer and inner faces c and d inclined outwardly, and a lower face b at right angles to the inner face c. A corner defined by the outer face d and the lower face b is indented to form a recess α and an abutment face e for the glass plate 19 or 34 or for an edge 45 of the cabin door 33. The square pipe has short sides g in the transverse direction and long sides h in the vertical direction. Furthermore, lateral top frame members 12 have a smaller difference between an outside distance L and an inside distance l than in the prior art (conventional structure), and the inside distance l is greater than in the prior art when the outside distance L is the same as in the prior art. Similarly, the front and rear top frame members 12 have a greater inside distance therebetween than in the prior art.

Each of the front struts 9 comprises the same square pipe as does each of the top frame members 12 as shown in FIG. 13. The extensive employment of square pipes having an identical sectional shape contribute toward low cost. Each of the intermediate struts 11 comprises a square pipe having a rectangular section with two outer corners thereof indented as shown in FIG. 14. Each of the rear struts 10 comprises a square pipe having a rectangular section with two diagonally opposite corners indented as shown in FIG. 15.

Each of these struts 9, 10 and 11 also has short sides g in the transverse direction and long sides in the longitudinal direction of the cabin, and defines a recess or recesses α in a corner or corners between an outer face or faces and a face or faces opposed to the glass plate or plates, thereby to provide a spacious cabin interior.

Although the right and left front struts 9 do not define recesses for receiving the edges of the front glass plate 19, the front strut 9 may comprise a square pipe having the same sectional shape with the recesses as the square pipe constituting the rear strut 10. Since the cabin interior can be designed to have a good longitudinal distance, the front and rear top frame members may each comprise a pipe having a quadrate section but should define a recess.

The floor sheet 7 of the cabin 6 is formed of a single sheet metal and comprises a combination of flat portions 46 and 46' and rising portions 47 and 48. This construction is strong against a bending force acting transversely. Right and left parts of the flat portion 45 constitutes steps 49. Since the floor sheet 7 is connected to the lower ends of the struts 9, 10 and 11, the entire cabin has an excellent strength particularly in the transverse direction.

in the described embodiment each of the struts 9, 10 and 11 comprises a square pipe having the short sides g transversely of the cabin and the long sides h longitudinally of the cabin, and each of at least the laterally disposed top frame members comprises a square pipe having the short sides transversely of the cabin and the long sides in the vertical direction. Furthermore, each of the struts and top frame members defines a recess or recesses in the outer corner or corners to receive the edge or edges of the glass plate or plates. This construction has the advantage of allowing the cabin to have a large interior space in the transverse direction. In addition to the large accommodating space for the driver, the construction permits the glass plates to be mounted simply and economically.

What is claimed is:

1. A method for assembling a transparent front panel arrangement in a tractor cab wherein the cab has frame members defining upper and lower trapezoidal areas and elastic holding elements are provided for holding said front panel arrangement to said frame members, comprising providing first and second trapezoidal transparent panels with substantially horizontal long sides, urging said first panel upwardly into said upper area to engage the elastic holding elements adjacent said frame members, with the long side thereof facing downwardly, urging said second panel downwardly into said lower area to engage the elastic holding elements adjacent said frame members, with the long side thereof facing upwardly, then holding said panels with their long sides vertically spaced apart a distance substantially equal to the thickness of the panels while inserting a transparent adhesive in the space between said long edges, and continuing to hold said panels apart until said adhesive has set.

* * * * *